(12) United States Patent
Wu et al.

(10) Patent No.: US 11,076,466 B2
(45) Date of Patent: Jul. 27, 2021

(54) LIGHT INTENSITY ADJUSTMENT CIRCUIT

(71) Applicant: QISDA CORPORATION, Taoyuan (TW)

(72) Inventors: Tsung-Hsun Wu, Taoyuan (TW); Chi-Jen Chen, Taoyuan (TW); Yuan-Ting Fang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/030,413

(22) Filed: Sep. 24, 2020

(65) Prior Publication Data
US 2021/0204378 A1 Jul. 1, 2021

(30) Foreign Application Priority Data
Dec. 30, 2019 (CN) .......................... 201911389793.X

(51) Int. Cl.
*H05B 45/10* (2020.01)
*H05B 47/10* (2020.01)

(52) U.S. Cl.
CPC .................................... *H05B 47/10* (2020.01)

(58) Field of Classification Search
CPC ........ H05B 45/10; H05B 45/32; H05B 45/37; H05B 45/325; H05B 45/3725; H05B 47/10; H05B 47/11; Y02B 20/30; Y02B 20/40
See application file for complete search history.

(56) References Cited

U.S. PATENT DOCUMENTS

| | | | | |
|---|---|---|---|---|
| 7,508,856 B2 * | 3/2009 | Kubo | .................... | G03G 15/326 347/247 |
| 7,817,330 B2 * | 10/2010 | Arai | ....................... | G09G 3/346 359/290 |
| 8,022,634 B2 * | 9/2011 | Greenfeld | .............. | H05B 45/37 315/192 |
| 8,330,380 B2 * | 12/2012 | Fujimura | ............... | H05B 45/10 315/200 R |
| 9,119,266 B1 * | 8/2015 | Lebens | .................... | F21L 4/027 |
| 9,769,898 B1 * | 9/2017 | Buthker | ................. | H05B 45/48 |
| 9,885,612 B2 * | 2/2018 | Yamada | ................ | G01J 5/0896 |
| 9,967,938 B2 * | 5/2018 | Chen | ....................... | H05B 45/37 |
| 10,028,351 B2 * | 7/2018 | Chen | ...................... | H05B 45/20 |

* cited by examiner

*Primary Examiner* — Haissa Philogene

(57) ABSTRACT

A light intensity adjustment circuit includes a delay circuit, a switching circuit and a light-emitting circuit. The delay circuit includes a capacitor and is used to receive a first pulse width modulation signal and generate a delay signal according to the first pulse width modulation signal. The switching circuit includes a switching unit and an isolation circuit. The switching unit includes a control terminal coupled to the delay circuit and used to receive the delay signal, and a first terminal used to generate a current according to the delay signal. The isolation circuit is coupled to the first terminal of the switching unit and generate a second pulse width modulation signal according to the current. The light-emitting circuit is used to receive the second pulse width modulation signal and emit light accordingly.

14 Claims, 5 Drawing Sheets

US 11,076,466 B2

LIGHT INTENSITY ADJUSTMENT CIRCUIT

CROSS REFERENCE TO RELATED APPLICATION

This non-provisional application claims priority of China patent application No. 201911389793.X, filed on 30 Dec. 2019, included herein by reference in its entirety.

BACKGROUND OF THE INVENTION

1. Field of the Invention

The invention relates to electronic circuits, and in particular, to a light intensity adjustment circuit.

2. Description of the Prior Art

As the number of lighting equipment and display devices continues to grow, manufacturers have incorporated an increasing number of functions into products to provide adjustment flexibility, including a light intensity adjustment function for adjusting the light intensity. Users can adjust the light intensity according to actual requirements, e.g., increasing the light intensity in high ambient light conditions and decreasing the light intensity in low light conditions, saving energy while delivering suitable visual effects. Dedicated chips have been employed to realize light adjustment, leading to increased circuit complexity and manufacturing costs.

SUMMARY OF THE INVENTION

According to one embodiment of the invention, a light intensity adjustment circuit includes a delay circuit, a switching circuit and a light-emitting circuit. The delay circuit includes a capacitor and is used to receive a first pulse width modulation signal and generate a delay signal according to the first pulse width modulation signal. The switching circuit includes a switching unit and an isolation circuit. The switching unit includes a control terminal coupled to the delay circuit and used to receive the delay signal, and a first terminal used to generate a current according to the delay signal. The isolation circuit is coupled to the first terminal of the switching unit and used to generate a second pulse width modulation signal according to the current. The light-emitting circuit is used to receive the second pulse width modulation signal and emit light accordingly.

According to another embodiment of the invention, a light intensity adjustment circuit includes a delay circuit, a comparison circuit and a light-emitting circuit. The delay circuit includes a capacitor and is used to receive a first pulse width modulation signal and generate a delay signal according to the first pulse width modulation signal. The comparison circuit includes a comparator and an inverter. The comparator includes a first input terminal used to receive the delay signal, a second input terminal used to receive a reference voltage, and an output terminal. The inverter includes an input terminal coupled to the output terminal of the comparator, and an output terminal used to generate a second pulse width modulation signal. The light-emitting circuit is used to receive the second pulse width modulation signal and emit light accordingly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
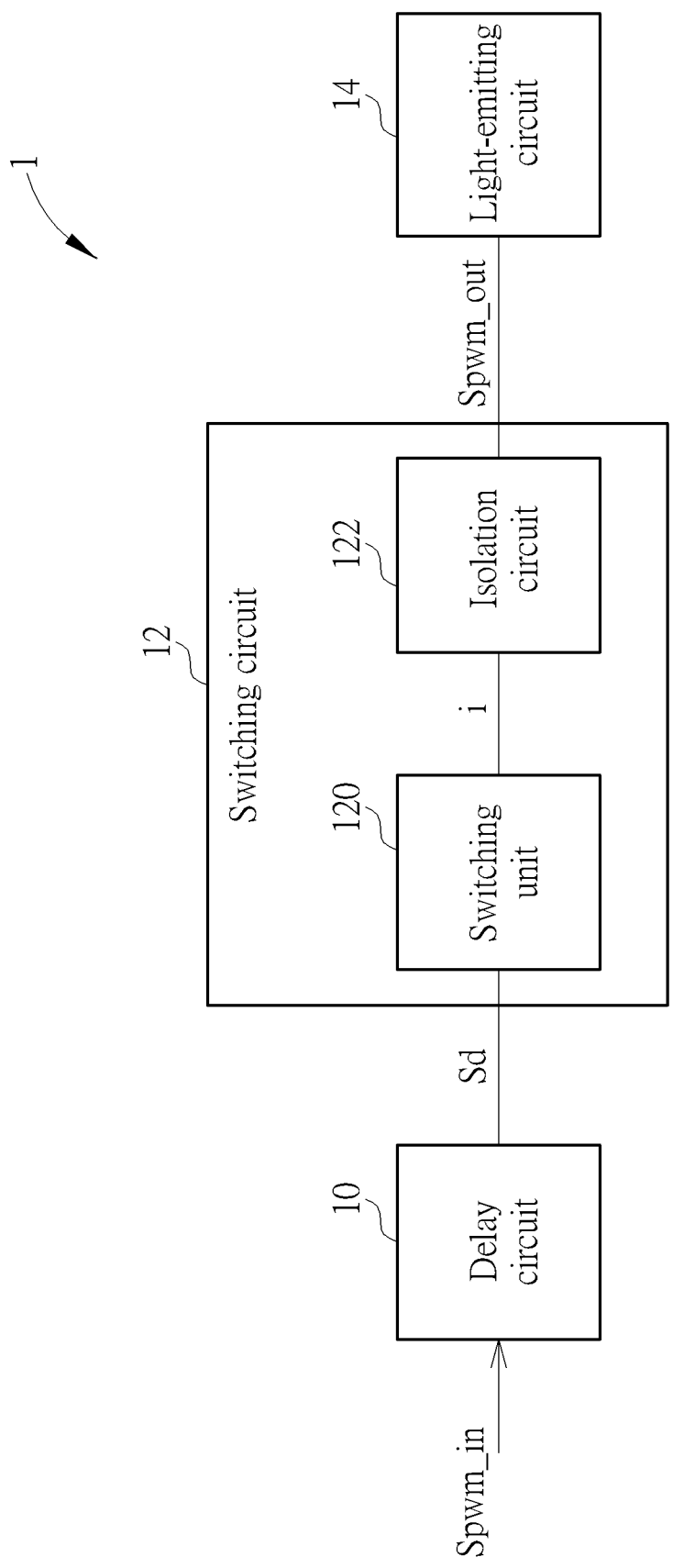
FIG. 1 is a block diagram of a light intensity adjustment circuit according to an embodiment of the invention.

FIG. 1 is a block diagram of a light intensity adjustment circuit 1 according to an embodiment of the invention. The light intensity adjustment circuit 1 includes a delay circuit 10, a switching circuit 12 and a light-emitting circuit 14 sequentially coupled to each other. The light-emitting circuit 14 may be a laser device such as red, green, blue (RGB) laser guns, or a light-emitting diode device such as indoor or outdoor lighting equipment. The light-emitting circuit 14 may emit light. The delay circuit 10 and the switching circuit 12 may adjust (e.g., increase) the light intensity of the light-emitting circuit 14.

The delay circuit 10 includes a capacitor, and may receive a first pulse width modulation signal Spwm_in and generate a delay signal Sd according to the first pulse width modulation signal Spwm_in. The switching circuit 12 may include a switching unit 120 and an isolation circuit 122 coupled to each other. The switching unit 120 includes a control terminal coupled to the delay circuit 10 and configured to receive the delay signal Sd, and a first terminal configured to generate a current i according to the delay signal Sd. The isolation circuit 122 may be coupled to the first terminal of the switching unit 120, and may generate a second pulse width modulation signal Spwm_out according to the current i. The second pulse width modulation signal Spwm_out has a pulse width exceeding a pulse width of the first pulse width modulation signal Spwm_in. The light-emitting circuit 14 may receive the second pulse width modulation signal Spwm_out to generate the light having light intensity in proportion to the pulse width of the second pulse width modulation signal Spwm_out.

Figure 2:
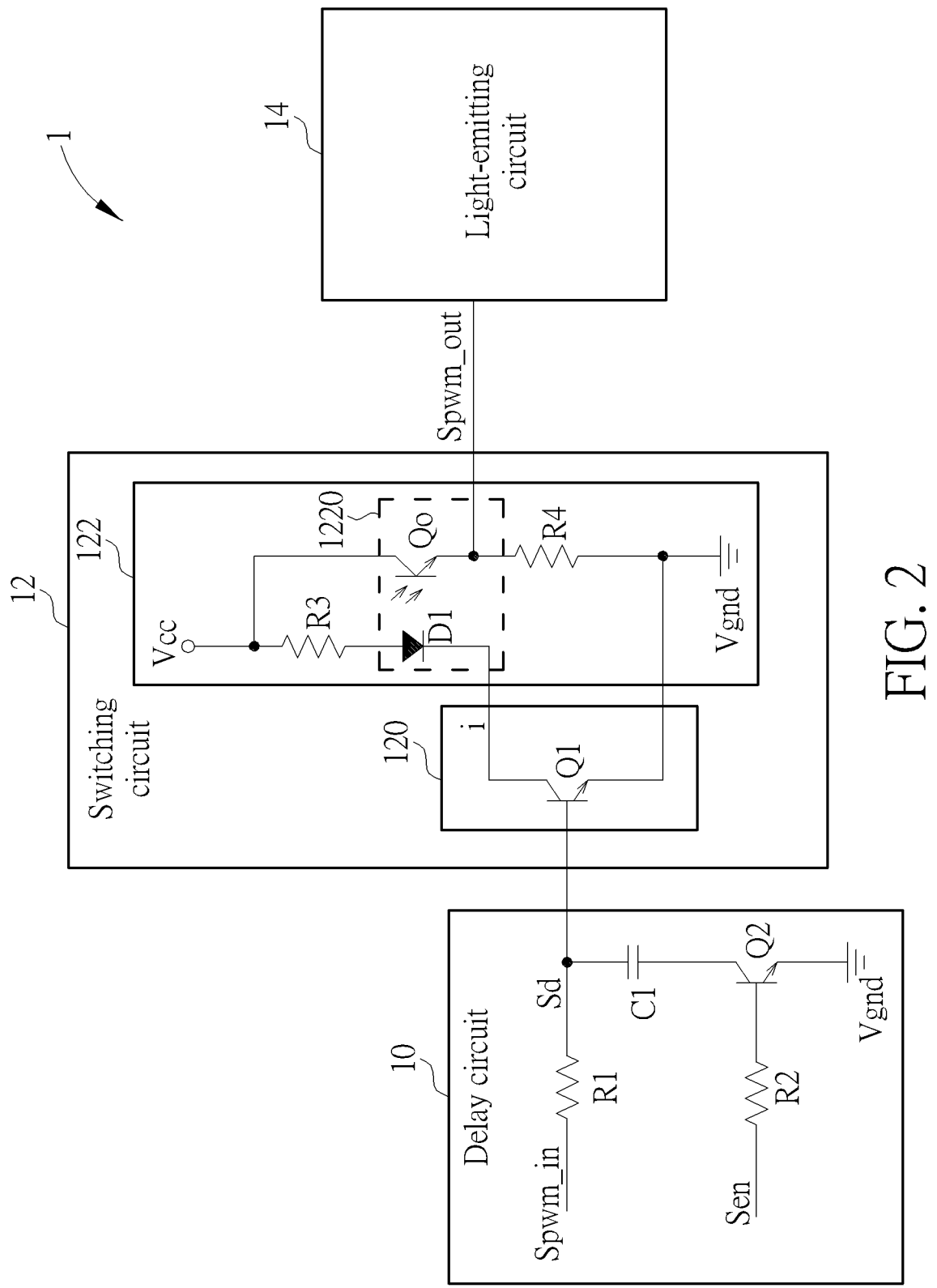
FIG. 2 is a circuit schematic of the light intensity adjustment circuit in FIG. 1.

FIG. 2 is a circuit schematic of the light intensity adjustment circuit 1. The delay circuit 10 may include a capacitor C1, a first resistor R1, a second resistor R2 and a second transistor Q2. The first resistor R1 includes a first terminal configured to receive the first pulse width modulation signal Spwm_in, and a second terminal. The first resistor R1 may be a variable resistor or a fixed-value resistor. The first resistor R1 may have resistance ranging between 1 and 10 KΩ. In some embodiments, the delay circuit 10 may employ an external resistor such as an output resistor of a front end circuit to replace the first resistor R1, so as to selectively eliminate the first resistor R1. The capacitor C1 includes a first terminal coupled to the second terminal of the first transistor R1, and a second terminal. The capacitor C1 may have capacitance such as 1000 uF. The delay circuit 10 may have a time constant defined by a product of the resistance of the first resistor R1 and the capacitance of the capacitor C1. The larger the time constant is, the wider the pulse width of the delay signal Sd. The second resistor R2 includes a first terminal configured to receive an enabling signal Sen, and a second terminal. The first resistor R2 may have resistance such as 1oon. The second transistor Q2 includes a control terminal coupled to the second terminal of the second resistor R2, a first terminal coupled to the second terminal of the capacitor C1, and a second terminal configured to receive a ground voltage Vgnd, e.g., 0V. When the enabling signal Sen is set to a logical low level, e.g., 0V, the second transistor Q2 may be turned off to float the second terminal of the capacitor C1, thereby outputting the delay signal Sd having a pulse width substantially identical to the pulse width of the first pulse width modulation signal Spwm_in. When the enabling signal Sen is set to a logical high level, e.g., 3.3V, the second transistor Q2 may be turned on to ground the second terminal of the capacitor C1, thereby outputting the delay signal Sd having a pulse width exceeding the pulse width of the first pulse width modulation signal Spwm_in. The second transistor Q2 may be an N-type bipolar junction transistor (BJT), an N-type metal-oxide semiconductor field effect transistor (MOSFET) or other types of transistors.

The switching unit 120 may include a first transistor Q1. The first transistor Q1 includes a control terminal configured to receive the delay signal Sd, a first terminal configured to generate a transistor current i according to the delay signal Sd, and a second terminal configured to receive the ground voltage Vgnd. When the voltage in the delay signal Sd exceeds a predetermined value, the first transistor Q1 may be turned on to generate the transistor current i. The magnitude of the transistor current i is in proportion to a difference between the voltage in the delay signal Sd and the predetermined value. When the voltage in the delay signal Sd is less than the predetermined value, the first transistor Q1 may be turned off to stop generating the transistor current i. The predetermined value may be the threshold voltage of the first transistor Q1, e.g., 0.7V. The first transistor Q1 may be an N-type BJT, an N-type MOSFET or another type of transistor. Since the voltage will drop by the threshold voltage when passing from the control terminal to the second terminal of the first transistor Q1, a pulse width of transistor current i will be less than the pulse width of the delay signal Sd, and exceed the pulse width of the first pulse width modulation signal Spwm_in.

The isolation circuit 122 may include a third resistor R3, a fourth resistor R4 and a photocoupler 1220. The third resistor R3 includes a first terminal configured to receive a supply voltage Vcc, and a second terminal. The third resistor R3 may have resistance such as 1000Ω. The photocoupler 1220 includes a light-emitting diode D1 and a phototransistor Qo. The supply voltage Vcc may be 3.5V. The light-emitting diode D1 may generate an optical signal according to the transistor current i. The light-emitting diode D1 includes a first terminal coupled to the second terminal of the third resistor R3, and a second terminal coupled to the first terminal of the first transistor Q1. The first terminal of the light-emitting diode D1 may be an anode, and the second terminal of the light-emitting diode D1 may be a cathode. When the transistor current i passes through the light-emitting diode D1, the light-emitting diode D1 may emit the optical signal. The light intensity of the optical signal is proportional to the magnitude of the transistor current i. When no transistor current i passes through the light-emitting diode D1, the light-emitting diode D1 may be stopped from emitting the optical signal. The phototransistor Qo includes a first terminal configured to receive the supply voltage Vcc, and a second terminal configured to generate the second pulse width modulation signal Spwm_out according to the optical signal. Upon detecting the optical signal, the phototransistor Qo may be turned on to set the second pulse width modulation signal Spwm_out to the logical high level; whereas when detecting no optical signal, the phototransistor Qo may be turned off to set the second pulse width modulation signal Spwm_out to the logical low level. The fourth resistor R4 includes a first terminal coupled to the second terminal of the phototransistor Qo, and a second terminal configured to receive the ground voltage Vgnd. The fourth resistor R4 may have resistance such as 1000Ω. The pulse width of the second pulse width modulation signal Spwm_out may be substantially equal to or less than the pulse width of the transistor current i, and exceed the pulse width of the first pulse width modulation signal Spwm_in. The light-emitting circuit 14 may adjust or increase the light intensity according to the pulse width of the second pulse width modulation signal Spwm_out.

Figure 3:
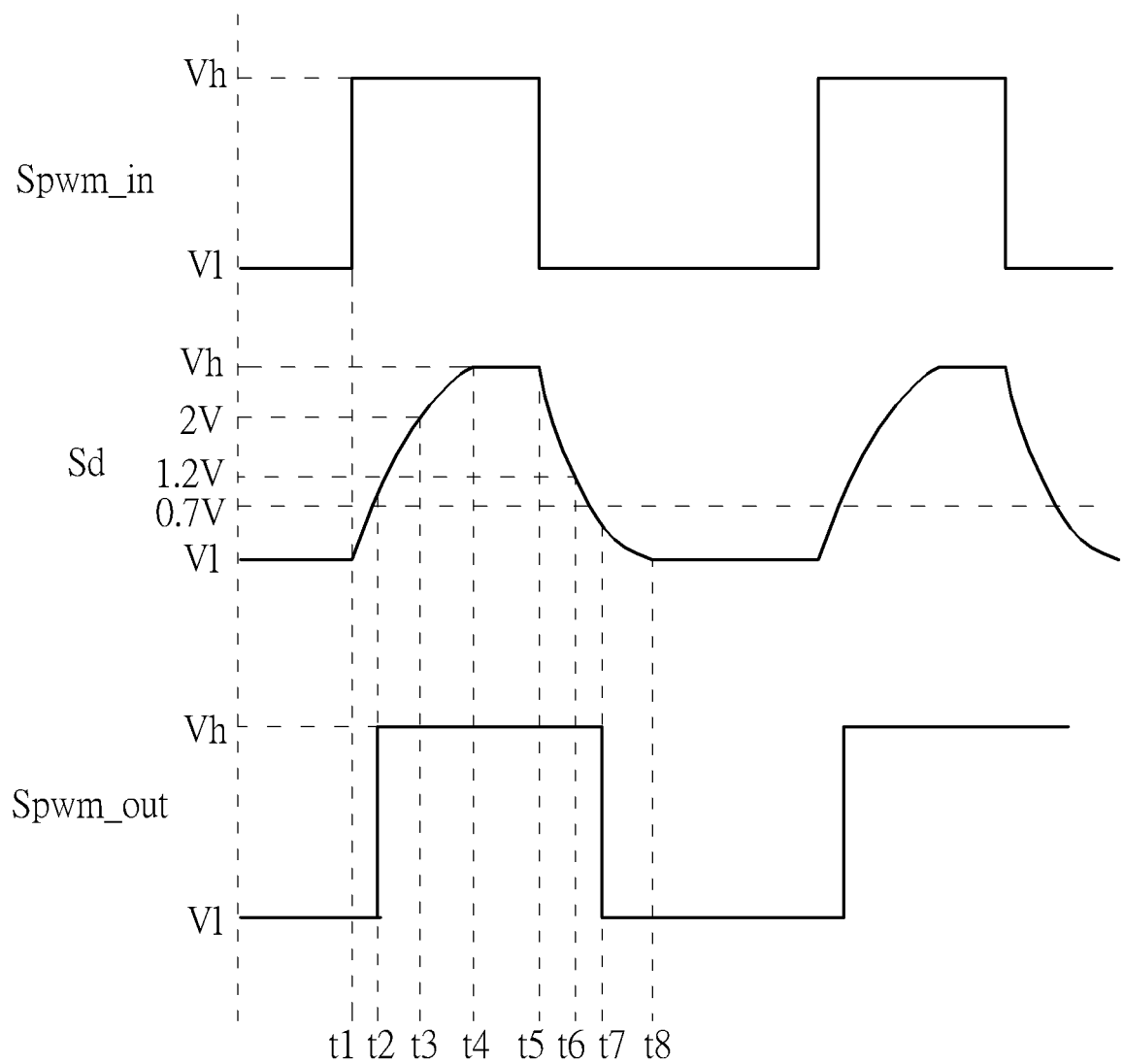
FIG. 3 is a timing diagram of the light intensity adjustment circuit in FIG. 1.

FIG. 3 is a timing diagram of the light intensity adjustment circuit 1, showing the first pulse width modulation signal Spwm_in, the delay signal Sd and the second pulse width modulation signal Spwm_out. The first pulse width modulation signal Spwm_in may have a 35% duty cycle. At Time t1, the first pulse width modulation signal Spwm_in is set to the logical high level Vh, while the delay signal Sd rises from the logical low level Vl. At Time t2, the delay signal Sd rises to 0.8V, and the second pulse width modulation signal Spwm_out is set to the logical high level Vh. At Time t3, the delay signal Sd rises to 2V, and the amount of voltage increase is approximately 63% of the logical high level Vh. A difference between Time t3 and Time t1 is referred to as a time constant. Between Time t4 and Time t5, the delay signal Sd substantially reaches the logical high level Vh, and the second pulse width modulation signal Spwm_out is maintained at the logical high level Vh. At Time t5, the first pulse width modulation signal Spwm_in is set to the logical low level Vl, while the delay signal Sd decreases from the logical high level Vh. At Time t6, the delay signal Sd decreases to 1.2V, and the amount of voltage decrease is approximately 63% of the logical high level Vh. At Time t7, the delay signal Sd decreases to 0.6V, and the second pulse width modulation signal Spwm_out is set to the logical low level Vl. A difference between Time t1 and Time t5 may be regarded as the pulse width of the first pulse width modulation signal Spwm_in. A difference between Time t2 and Time t7 may be regarded as the pulse width of the second pulse width modulation signal Spwm_out. At Time t8, the delay signal Sd substantially reaches the logical low level Vl. A difference between Time t1 and Time t8 may be regarded as the pulse width of the delay signal Sd. The second pulse width modulation signal Spwm_out may have a 48% duty cycle. Thus, the pulse width of the second pulse width modulation signal Spwm_out may exceed the pulse width of the first pulse width modulation signal Spwm_in, and the light-emitting circuit 14 may adjust or increase the light intensity according to the second pulse width modulation signal Spwm_out.

Figure 4:
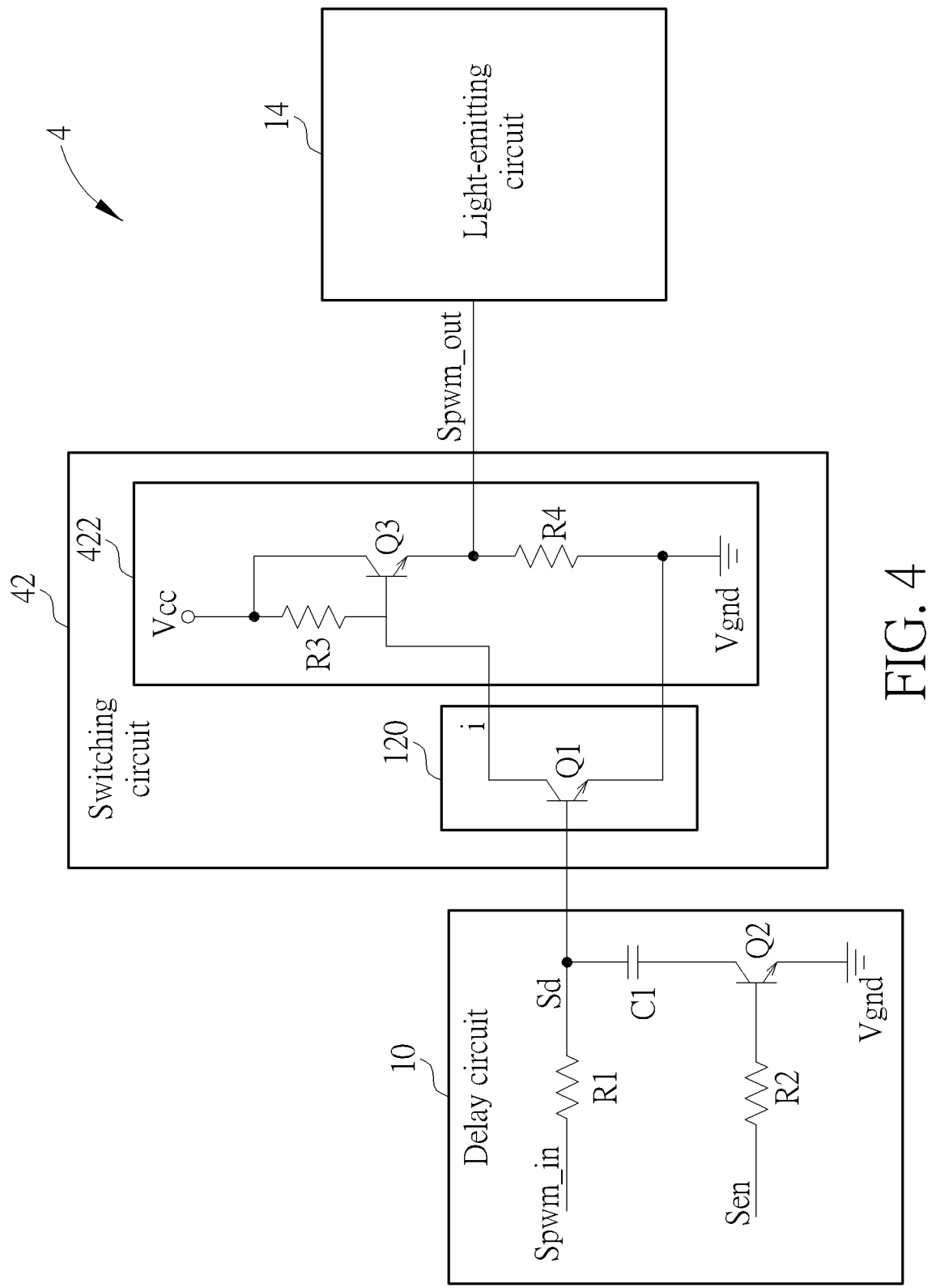
FIG. 4 is another circuit schematic of the light intensity adjustment circuit in FIG. 1.

FIG. 4 is a circuit schematic of a light intensity adjustment circuit 4 according to another embodiment of the invention. The light intensity adjustment circuit 4 in FIG. 4 and the light intensity adjustment circuit 1 in FIG. 2 are different in the isolation circuit 422 in the switching circuit 42. The isolation circuit 422 may include a third resistor R3, a fourth resistor R4 and a third transistor Q3. The third resistor R3 includes a first terminal configured to receive the supply voltage Vcc, and a second terminal. The third transistor Q3 includes a control terminal coupled the first terminal of the first transistor Q1 and the second terminal of the third resistor R3, a first terminal configured to receive the supply voltage Vcc, and a second terminal configured to generate the second pulse width modulation signal Spwm_out according to the transistor current i. The fourth resistor R4 includes a first terminal coupled to the second terminal of the third transistor Q3, and a second terminal configured to receive the ground voltage Vgnd. The transistor current i may flow through the third resistor R3 to establish a bias voltage at the control terminal of the third transistor Q3. When the bias voltage exceeds the threshold voltage of the third transistor Q3, the third transistor Q3 may be turned on to set the second pulse width modulation signal Spwm_out to the logical high level; whereas when the bias voltage is less than the threshold voltage of the third transistor Q3, the third transistor Q3 may be turned off to set the second pulse width modulation signal Spwm_out to the logical low level. The third transistor Q3 may be an N-type BJT, an N-type MOSFET or another type of transistor. The pulse width of the second pulse width modulation signal Spwm_out may exceed the pulse width of the first pulse width modulation signal Spwm_in, and the light-emitting circuit 14 may adjust or increase the light intensity according to the pulse width of the second pulse width modulation signal Spwm_out.

The light intensity adjustment circuits 1, 4 employ a delay circuit and a switching circuit to increase the pulse width of a signal, thereby increasing the light intensity, providing adjustment flexibility to a light-emitting circuit using limited electronic components.

Figure 5:
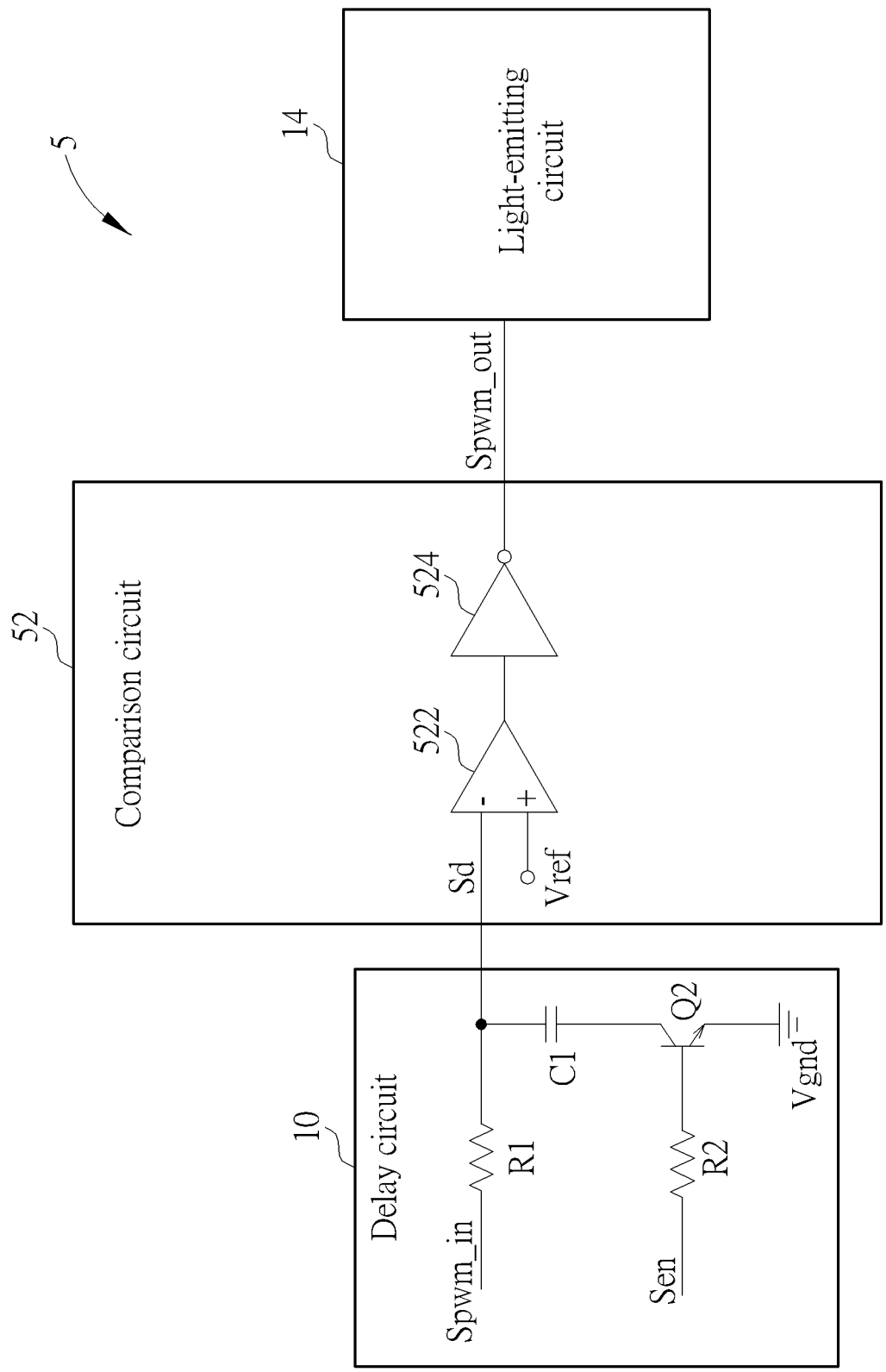
FIG. 5 is a circuit schematic of a light intensity adjustment circuit according to another embodiment of the invention.

FIG. 5 is a circuit schematic of a light intensity adjustment circuit 5 according to another embodiment of the invention. The light intensity adjustment circuit 5 in FIG. 5 and the light intensity adjustment circuit 1 in FIG. 2 are different in using a comparison circuit 52 to replace the switching circuit 12. The comparison circuit 52 includes a comparator 522 and an inverter 524. The comparator 522 includes a first input terminal configured to receive the delay signal Sd, a second input terminal configured to receive a reference voltage Vref, and an output terminal configured to output a comparison signal. When the voltage in the delay signal Sd exceeds the reference voltage Vref, the output terminal of the comparator 522 may output the logical low level, negatively in proportion to a difference between the voltage in the delay signal Sd and the reference voltage Vref. When the voltage in the delay signal Sd is less than the reference voltage Vref, the output terminal of the comparator 522 may output the logical high level. The inverter 524 includes an input terminal coupled to the output terminal of the comparator 522, and an output terminal. The inverter 524 may invert the comparison signal to generate the second pulse width modulation signal Spwm_out. The reference voltage Vref may be 1V, the comparator 522 may be an inverting comparator, and the pulse width of the delay signal Sd may exceed the pulse width of the second pulse width modulation signal Spwm_out. The smaller the reference voltage Vref is, the wider the pulse width of the second pulse width modulation signal Spwm_out will be. If the reference voltage Vref approaches 0V, the pulse width of the second pulse width modulation signal Spwm_out may substantially equal to the pulse width of the delay signal Sd, and substantially exceeds the pulse width of the first pulse width modulation signal Spwm_in, and the light-emitting circuit 14 may adjust or increase the light intensity according to the pulse width of the second pulse width modulation signal Spwm_out.

The light intensity adjustment circuit 5 employs a delay circuit and a comparison circuit to increase the pulse width of a signal, thereby increasing the light intensity, providing adjustment flexibility to a light-emitting circuit using limited electronic components.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light intensity adjustment circuit comprising:
    a delay circuit comprising a capacitor and configured to receive a first pulse width modulation signal and generate a delay signal according to the first pulse width modulation signal;
    a switching circuit comprising:
        a switching unit comprising a control terminal coupled to the delay circuit and configured to receive the delay signal, and a first terminal configured to generate a current according to the delay signal; and
        an isolation circuit coupled to the first terminal of the switching unit, and configured to generate a second pulse width modulation signal according to the current; and
    a light-emitting circuit configured to receive the second pulse width modulation signal and emit light accordingly.

2. The light intensity adjustment circuit of claim 1, wherein the second pulse width modulation signal has a pulse width exceeding a pulse width of the first pulse width modulation signal.

3. The light intensity adjustment circuit of claim 1, wherein when a voltage in the delay signal exceeds a predetermined value, the switching unit is configured to generate the current, and when the voltage in the delay signal is less than the predetermined value, the switching unit is configured to stop generating the current.

4. The light intensity adjustment circuit of claim 1, wherein the switching unit is a first transistor, the current is a transistor current, and the first transistor further comprises a second terminal configured to receive a ground voltage.

5. The light intensity adjustment circuit of claim 4, wherein the isolation circuit comprises:
    a third resistor comprising a first terminal configured to receive a supply voltage, and a second terminal;
    a photocoupler comprising:
        a light-emitting diode configured to generate an optical signal according to the transistor current, and comprising a first terminal coupled to the second terminal of the third resistor, and a second terminal coupled to the first terminal of the first transistor; and
        a phototransistor comprising a first terminal configured to receive the supply voltage, and a second terminal configured to generate the second pulse width modulation signal according to the optical signal; and
    a fourth resistor comprising a first terminal coupled to the second terminal of the phototransistor, and a second terminal configured to receive the ground voltage.

6. The light intensity adjustment circuit of claim 4, wherein the isolation circuit comprises:
    a third resistor comprising a first terminal configured to receive a supply voltage, and a second terminal;
    a third transistor comprising a control terminal coupled the first terminal of the first transistor and the second terminal of the third resistor, a first terminal configured to receive the supply voltage, and a second terminal configured to generate the second pulse width modulation signal according to the transistor current; and a fourth resistor comprising a first terminal coupled to the second terminal of the third transistor, and a second terminal configured to receive the ground voltage.

7. The light intensity adjustment circuit of claim 1, wherein:

the delay circuit further comprises a first resistor comprising a first terminal configured to receive the first pulse width modulation signal, and a second terminal; and the capacitor comprises a first terminal coupled to the second terminal of the first resistor, and a second terminal.

8. The light intensity adjustment circuit of claim 7, wherein the delay circuit further comprises:

a second resistor comprising a first terminal configured to receive an enabling signal, and a second terminal; and a second transistor comprising a control terminal coupled to the second terminal of the second resistor, a first terminal coupled to the second terminal of the capacitor, and a second terminal configured to receive a ground voltage.

9. The light intensity adjustment circuit of claim 7, wherein the first resistor is a variable resistor.

10. A light intensity adjustment circuit comprising:

a delay circuit comprising a capacitor and configured to receive a first pulse width modulation signal and generate a delay signal according to the first pulse width modulation signal;

a comparison circuit comprising:

a comparator comprising a first input terminal configured to receive the delay signal, a second input terminal configured to receive a reference voltage, and an output terminal; and an inverter comprising an input terminal coupled to the output terminal of the comparator, and an output terminal configured to generate a second pulse width modulation signal; and a light-emitting circuit configured to receive the second pulse width modulation signal and emit light accordingly.

11. The light intensity adjustment circuit of claim 10, wherein the second pulse width modulation signal has a pulse width exceeding that of the first pulse width modulation signal.

12. The light intensity adjustment circuit of claim 10, wherein:

the delay circuit further comprises a first resistor comprising a first terminal configured to receive the first pulse width modulation signal, and a second terminal; and the capacitor comprises a first terminal coupled to the second terminal of the first resistor, and a second terminal.

13. The light intensity adjustment circuit of claim 12, wherein the delay circuit further comprises:

a second resistor comprising a first terminal configured to receive an enabling signal, and a second terminal; and a second transistor comprising a control terminal coupled to the second terminal of the second resistor, a first terminal coupled to the second terminal of the capacitor, and a second terminal configured to receive a ground voltage.

14. The light intensity adjustment circuit of claim 12, wherein the first resistor is a variable resistor.

* * * * *